United States Patent [19]
Farrow

[11] 3,759,339
[45] Sept. 18, 1973

[54] DUAL PROPULSION TRICYCLE

[76] Inventor: Vernon J. Farrow, 143 N. Spencer, Mesa, Ariz. 85201

[22] Filed: July 18, 1972

[21] Appl. No.: 272,957

[52] U.S. Cl. ............................... 180/27, 180/65 R
[51] Int. Cl. .................................. B62k 11/00
[58] Field of Search ............... 180/27, 33 C, 25 R, 180/65 R, 65 A, 34

[56] References Cited
UNITED STATES PATENTS
3,598,195  8/1971  Steller ........................ 180/65 A X
3,713,502  1/1973  Delaney et al. ............... 180/65 R X

*Primary Examiner*—M. Henson Wood, Jr.
*Assistant Examiner*—Michael Mar
*Attorney*—Warren B. Lindsley

[57] ABSTRACT

A three-wheeled tricycle which may be manually propelled by the operator or quickly converted to electrical power propulsion by the simple manipulation of suitable controls by the operator.

6 Claims, 6 Drawing Figures

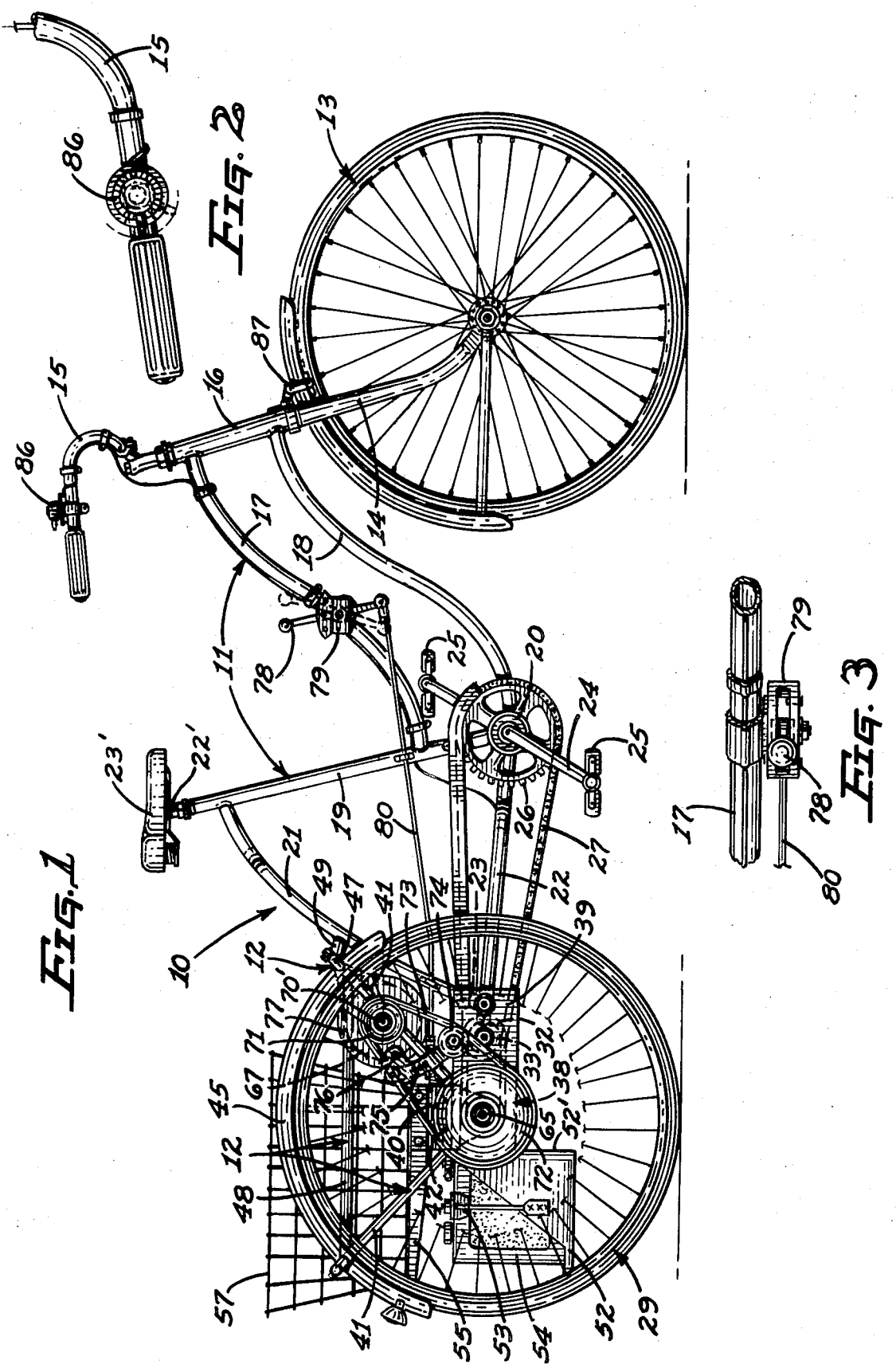

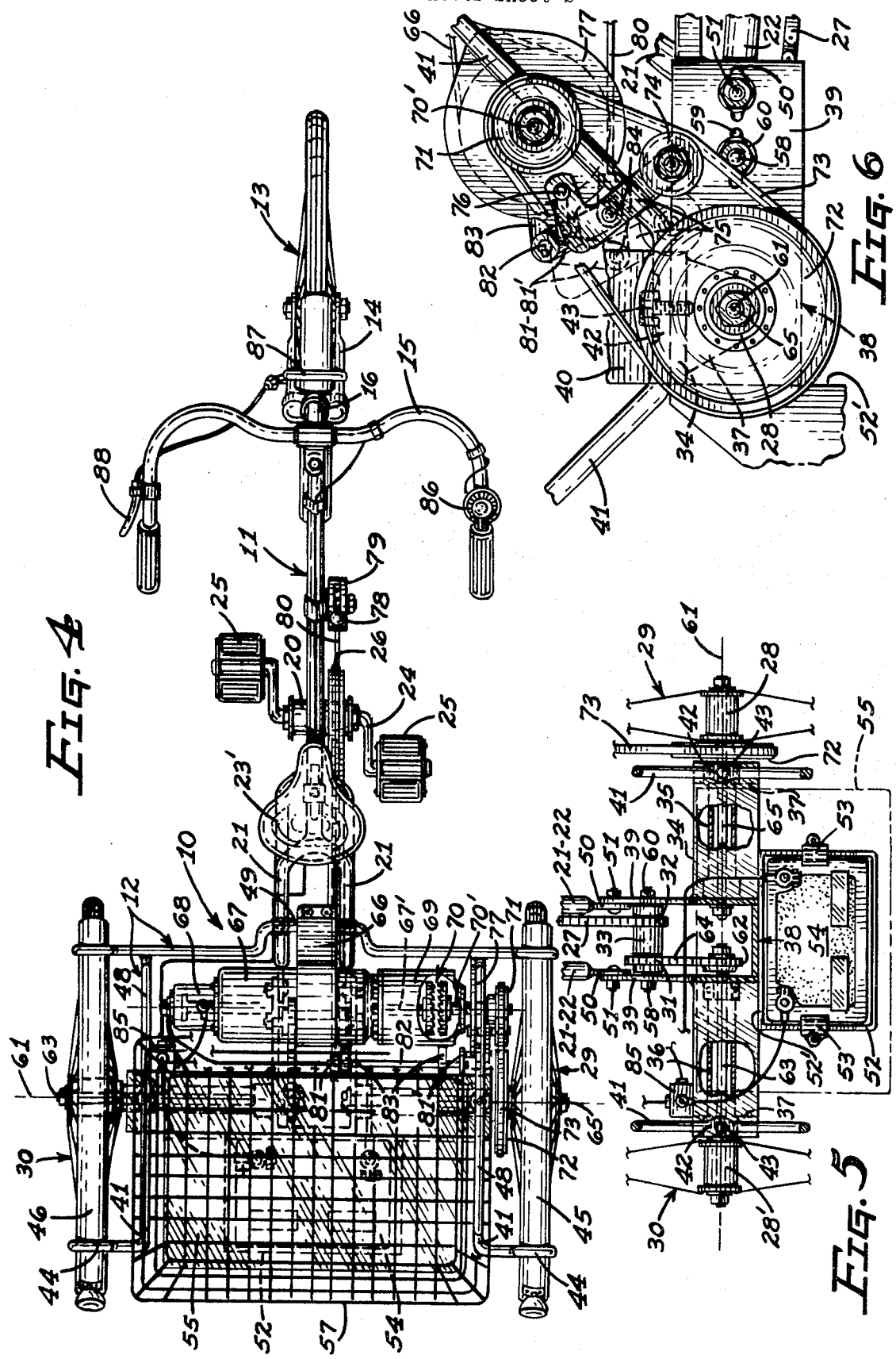

DUAL PROPULSION TRICYCLE

BACKGROUND OF THE INVENTION

This invention pertains to a combined manual and power operated tricycle.

FIELD OF THE INVENTION

This invention is particularly directed to the type of three-wheeled vehicle or tricycle which is commonly used by the residents of retirement communities for exercise and shopping purposes. Such tricycles are usually provided with a demountable wire basket or container which is mounted between the rear wheels, directly behind the tricycle seat, where it is handy for transporting groceries and other items obtained on the shopping trip.

At times the weight of the load being carried and the distance being traversed may be too great and tiring for the physical capacities of the operator, and to this end the tricycle of this invention is provided with electrical power means which may be quickly activated and utilized by the operator to propel the tricycle without any physical effort on his part.

SUMMARY OF THE INVENTION

In accordance with the invention claimed an improved tricycle is provided with new and improved transmission means for selective manual and/or electrical propulsion.

It is, therefore, the principle object of this invention to provide an improved three-wheeled vehicle or tricycle having the necessary facilities for either manual and/or power operation, a removable luggage rack or basket, and a suitable power source and propulsion means having simple manual controls associated therewith which alows the operator to select the type of propulsion desired and to control the speed of the tricycle.

Another object of this invention is to provide an improved tricycle having facilities for manual or power operation and load carrying means, which may be economically fabricated and produced in quantity by the association of these features with some of the present features and components of a standard two-wheeled bicycle.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWINGS

The present invention may be more readily described by reference to the accompanying drawings in which:

FIG. 1 is a right side elevational view of the tricycle of this invention with portions of the right rear wheel broken away to show the relation of the power drive components and the manual controls;

FIG. 2 is an enlarged fragmentary plan view of a portion of the tricycle handle bars showing the relation of the rheostat type electrical motor control the handle bar grip;

FIG. 3 is an enlarged fragmentary plan view showing the belt tightening device control and its preferred location relative to the tricycle frame;

FIG. 4 is a top plan view of the tricycle shown in FIG. 1 with some parts broken away and in dotted line to better illustrate the respective location of the various components;

FIG. 5 is a top plan view of the rear axle assembly with parts in section and broken away illustrating the respective locations of the storage battery power source and basket supporting shelf (in phantom line) relative to the axle housing; and FIG. 6 is a greatly enlarged fragmentary side elevational view, with the spokes of the right rear wheel removed to illustrate one method of attaching the drive train gear box and axle housings to the supporting frame members, and to illustrate the respective relation between the various pulleys in the power drive train.

DESCRIPTION OF THE PREFERRED EMBODIMENT

Referring now to the several views of the drawings for a more detailed description of the construction and other features of the invention by characters of refeence, FIGS. 1 and 4 illustrate the complete assembled manual or power driven tricycle 10 of this invention, which comprises the rigid forward structural frame assembly 11 and the rigid rear structural frame assembly 12.

To simplify and economize the fabrication of the three-wheeled tricycle of this invention, it is preferred that the major portion of a conventional two-wheeled ladies' type bicycle be utilized to construct the forward portion of the tricycle. This forward portion includes the structural frame member 11 employing a steerable front wheel assembly 13, steering fork 14 and the usual handle bars 15. These components are mounted to rotate in a steering column 16 which is rigidly connected to upper and lower downwardly sloping frame members 17 and 18 respectively, and to the vertically inclined seat support bar 19 and cylindrical sprocket crank housing 20. The conventional structural frame member 11 also includes a downward and rearward extending fork member 21 which is secured by welding to the top portion of the vertically inclined seat support bar 19 and the rearwardly extending fork member 22, which is secured by welding to the sprocket crank housing 20. The respective downwardly and rearwardly extending side arms of each fork member are flattened and integrally joined together at their intersection 23, as shown in FIG. 1, to form the rigid frame structure 11.

The tubular top end of the vertically inclined seat support bar 19 is adapted to receive an adjustable seat bracket 22', which supports the usual spring cushioned operator's seat 23'. The sprocket crank housing 20 at the lower end of seat support bar 19 is adapted to receive and support in rotative relation a pedal crank 24 with its foot pedals 25 and large sprocket gear 26 attached thereto in the usual manner. Manual rotation of pedal crank 24 by foot pressure applied to pedals 25 causes the large sprocket gear 26 to be rotated and by means of the usual drive chain 27 drives a smaller sprocket gear attached to the rear driving wheel. A coaster brake-type hub (not shown) completes the drive train which is normally utilized to propel the conventional two-wheeled bicycle in a forward direction and by proper manipulation of the foot pedals 25 causes the bicycle to coat or the rear wheel brake to be applied as so desired.

In order to utilize the major portion of a conventional bicycle, above described, to construct the tricycle of this invention, it is necessary to remove the rear drive wheel assembly from the bicycle and either discard it or remove and replace the coaster brake equipped hub and small sprocket gear assembly with a simple bearing equipped tubular hub assembly 28 such as shown in FIG. 5 of the drawings. This reworked wheel assembly is suitable for use as one of the rear wheels 29 or 30 of the tricycle. The removed coaster brake equipped hub and small sprocket gear assembly may be reworked by simply installing another sprocket gear 31 of the same size as the original sprocket gear 32 in parallel relation with that gear, at the left side of the coaster brake equipped hub 33, to function as part of the manually operated drive train of the tricycle.

The rigid rear structural frame assembly 12, which includes the transverse horizontal platform 34 located directly over the rear axle housings 35 and 36, is provided with depending brackets 37 at its outer ends having apertures through which the outer ends of the tubular axle housings extend to support the housings in parallel relation with the horizontal platform 34. A rectangular shaped gear box 38 welded or otherwise secured to the underside of platform 34 and located on the longitudinal center line on the tricycle, is provided with a pair of integral forwardly extending parallel plates 39 and a pair of upwardly extending plates 40, which together form the spaced-apart sides of gear box 38.

The inner ends of the rear axle housings 35 and 36 are welded or otherwise secured to the outer side walls of gear box 38. Two pairs of duplicate downwardly depending and converging side bars 41 forming an integral part of the rear structural frame assembly 12 are located in parallel relation to each other inside of the rear wheels 29 and 30. These side bars are integrally joined together by flattened cross bars 42 which rest on and are rigidly secured by bolts 43 to the top surface of platform 34.

The rear converging side bars 41 of each pair are provided at their top ends with right angle extensions 44 which are curved at their outer ends to partially surround the respective rear wheel mud guards 45 and 46 to which they are secured, as shown in FIGS. 1 and 4.

The front converging side bars 41 extend forward and upward a distance just above the mud guards 45 and 46 where they are joined by welding to a transverse tie rod 47. Tie rod 47 extends out and over the mud guards at both sides to partially surround the mud guards to which they are secured. The pairs of converging side bars are each joined together near their upper ends to horizontal tie rods 48 to stiffen and add strength to the structural frame assembly 12.

The transverse tie rod 47 is bent at its center to form a forwardly projecting loop portion 49 which is somewhat wider than the rearwardly extending fork member 21 to which it is rigidly secured on both sides. The joined intersections 23 of fork members 21 and 22 are provided with flattened rearwardly projecting lugs or tabs 50 which are adapted to engage the parallel inner sides of the forwardly extending plates 39 of the gear box 38. Tabs 50 and plates 39 are each provided with aligned and preferably elongated holes 50' through which bolts 51 may be inserted and secured by nuts to complete the adjustable attachment of the rear structural frame assembly 12 to the forward structural frame assembly 11 of the conventional bicycle.

The rear structural frame assembly 12 also includes a battery support platform 52 which is adapted to partially enclose and support thereon by suitable clamping devices 53 in removable relationship an automotive type, rechargable battery 54, preferably of twelve volt capacity. This battery provides the source of electrical energy necessary to propel the tricycle through suitable power drive train elements. The battery support platform is preferably positioned directly behind and rigidly secured to the rear wall 52' of the gear box to equalize and stabilize the upsprung weight of the frame, the drive train components, the rear axle housings 35 and 36, the battery support platform 52, the battery 54, the shopping basket or container support platform 55 among other things. The combined weight of these elements is carried on the hub assemblies 28 of the drive wheels 29 and 30 and the fork members 21 and 22 to which the structural frame assembly 12 is attached.

The shopping basket or container support platform 55 is detachably mounted directly above the top of the battery 54, allowing for access space to the water filler vent caps and connecting posts on the top of the battery. It rests upon the top edges of the pair of upwardly extending plates 40 of the gear box 38 where it is secured thereto by means of integrally depending flanges which are bolted to the sides of plates 40. The shopping basket or container 56 is adapted to be detachably mounted on the top surface of support platform 55 in any suitable manner, such as by easily removable spring hold down clamps (not shown). The container itself may be of any desired type such as light weight wire basket 57, shown in FIGS. 1 and 4 of the drawings, which could be readily removed from the platform 55 thereby utilizing it for shopping purposes, and then returning to the platform.

The manually operated drive train preferably utilized to propel the tricycle of this invention consists of the usual crank 24, foot pedals 25, large sprocket gear 26, drive chain 27, and the original small sprocket gear 32 which is fixed on the right side of the free-wheeling, coaster brake equipped hub 33. Hub 33 is mounted to rotate on the hub shaft or axle 48 which is adjustably fixed in elongated holes 59 between the pair of forwardly extending plates 39 of the gear box 38 by means of lock nuts 60 in parallel relationship to the center line 61 of the axle housings. This arrangement provides for tension adjustment of the drive chain 27.

The manually operated drive train also includes the sprocket gear 31 which is fixed on the left side of hub 33, and is preferably of the same size as the sprocket gear 32. Both sprocket gears are mounted to rotate in unison. Sprocket gear 31 is adapted to drive or rotate another sprocket gear 62 of the same size fixed to the inner end of rotatable axle shaft 63 within gear box 38 by means of a short drive chain 64. This connection causes rotational movement of driven hub 33 to be transferred to axle shaft 63 which is mounted to rotate on suitable bearings within the left rear axle housing 36. Axle shaft 63 extends into hub 28' of the left road wheel 30 to which it is keyed or splined to effect forward manual propulsion of the tricycle 10.

When the tricycle is being manually propelled as described, the right rear road wheel 29 may be allowed to freely rotate on suitable bearings within its hub assembly 28 about the fixed axle shaft 65. Shaft 65 is nonrotatively mounted within right rear axle housing 35 and is secured inside gear box 38 in transverse alignment with the left rear rotatable axle shaft 63 as shown in FIG. 5. The road wheel 29 may also be allowed to assist in the manual propulsion of the tricycle by the power operated drive train application when climbing steep inclines or traversing soft terrain and the like, which will be further explained as this description proceeds.

The features of construction of the rear structural frame assembly and the manually operated power train are more fully shown and described in U.S. Pat. Nos. 3,592,487, granted July 13, 1971 to Richard C. Mansperger, and 3,664,683 granted May 23, 1972 to Allen B. Gobby.

The power operated drive train includes in addition to the twelve volt storage battery 54, carried on platform 52 to the rear of the gear box 38 a D. C. variable speed electric motor 67 held in fork member 21 by clamp member 66 fastened to the centrally located loop portion 49 of the transverse tie rod 47. The motor is provided at its left end with a suitable electric solenoid 68 and at its right end with an enclosed reduction gear mechanism 69 which includes the motor drive shaft 67' and one element of the clutch mechanism 70. The clutch is shown disengaged (in FIG. 4) from its mating clutch element. Its aligned drive shaft 70' projects out to the right from the end of the reduction gear housing 69. On the outer end of shaft 70' is fixed a small drive pulley 71 which is adapted to drive the right road wheel 29 by means of a larger pulley 72. Pulley 72 is fixed to hub 28 of the road wheel and is connected in driving relation thereto by a continuous belt 73.

Belt 73 is quite loose when initially installed and is adapted to be placed in tightened relationship to drive the large pulley 72 and road wheel 29 through the controlled action of a small idler pulley 74. Pulley 74 is mounted to rotate freely on the lower end of an L-shaped link member 74 into and out of contact with drive belt 73. The link member 75 is secured in pivotal relationship at 76 to the outer edge of a rigid plate 77. Plate 77, in turn, is welded to the right rear converging side bar 41 of the rear structural frame 12 of the tricycle.

The idler pulley 74 is placed into or out of contact with drive belt 73 by the manual adjustment of control lever 78 pivotally mounted in a sector case 79 secured to the forward structural frame assembly 11 of the tricycle, as shown in FIG. 1. Control lever 78 has attached thereto at its lower end by means of a clevis, a rigid control rod 80. Rod 80 extends rearwardly guided by suitable clips mounted on the frame members under and beyond motor 67 at its rearward end it is pivotally connected to the inner one, of two lever arms 81 and 81' respectively, which are fixed to the rotatable shaft 82. Shaft 82 is supported in apertures in lugs 83 which project from and are integrally secured to the motor or gear housing 69. Outer lever arm 81' is connected at 84 by suitable linkage to L-shaped link member 75 to pivot the same about its pivot point 76 to thereby increase or decrease the pressure of idler pulley 74 on the belt 73 by the manual positioning of the control lever 78. This action causes control rod 80 to be moved forward or backward as desired by the operator of the tricycle. The control lever is adapted to remain in adjusted position by means of spring detents or notches placed at desired positions in the sector case 79 until released by the operator.

The electrical system of the power drive train also includes solenoid switch 85 which is preferably fastened to the left side of the rear structural frame 12 adjacent the solenoid 68 at the left end of the electric motor 67. It is connected by a cable or lead to the positive terminal of the battery. Another lead is connected from the switch to a rear contact of electric solenoid 68. A third lead connects switch 85 with the speed control rheostat 86 which is preferably mounted on the right arm of the handle bars 15 adjacent the rubber hand grip. Rheostat 86 may be adjusted to any desired position, including, for instance, the calibrated positions indicating "Off," "Low," "Med.," and "High" indicating motor operating conditions. The negative terminal of the battery is connected by a cable or lead to the end of solenoid 68 at the left end of motor 67 to complete the electrical system.

With the operator of the tricycle seated comfortably on seat 23' and holding foot pedals 25 in coasting or braking position, with the manually driven left rear wheel 30 of the tricycle free-wheeling in the well known manner, the operator to electrically drive the tricycle places control lever 78 in forward position (as indicated in dotted line in FIG. 1). This action relieves the pressure of the idler pulley 74 on the continuous drive belt 73, causing the belt to fit loosely about the small drive pulley 71 and the large pulley 72. As heretofore explained pulley 72 is fixed to hub 28 on the right power driven road wheel 29.

The operator then moves the control arm of the rheostat 86 mounted on the right arm of handle bars 15 from the "Off" position to the "Low" or "Med." position (as shown in FIG. 2). This action causes the solenoid switch 85 to close, cuaisng electrical current to flow through and actuate motor solenoid 68 and variable speed motor 67. Energization of solenoid 68 causes one element of clutch 70 to be moved into locked relation with the other clutch element fixed to the aligned drive shaft 70' which has the small drive pulley 71 fixed thereon. At the same time motor 67 is energized causing rotation of the motor drive shaft 67', reduction gear mechanism 69, clutch 70 and the drive shaft 70', thereby rotating the small drive pulley 71 at the desired speed.

When the above action takes place, the drive belt 73, as previously stated, is loose, and therefore provides no driving contact with the respective drive pulleys 71 and 72, and consequently no load on motor 67. The operator then pulls back on the manual control lever 78, causing the rigid control rod 80 to be pulled forward, transferring this motion to the rotatable shaft 82 and thence to link member 75. Idler pulley 74 is attached to link member 75 thereby causing pulley 74 to contact and exert pressure on drive belt 73, tightening the belt and causing the same to apply rotative movement to the large drive pulley 72. Rotation of pulley 72 causes rotation of the right road wheel 29, resulting in forward movement of the tricycle. At this time the rheostat 86 may be advanced to increase the speed of the tricycle, if so desired.

Should the power operated road wheel 29 lack sufficient traction to move the tricycle forward, because of loose soil or sand on the roadway, or because the tricycle might be climbing a wet-surfaced incline, the manually operated drive train previously described which provides driving power to the left road wheel 30, can be used in conjunction with the power operated drive train by the simple expedient of the operator utilizing the foot pedals 25 in the normal manner. This additional power applied to both road wheels overcomes the loss of traction of the other wheel and assists the power drive train in propelling the tricycle.

Should it be necessary to apply the tricycle's brakes, when power operated, it would be advisable for the operator to move the manual control lever 78 forward, thereby loosening drive belt 73 causing the raod wheel 29 to free-wheel. The rear wheel brake is then applied in the normal manner by placing backward reverse force on the foot pedals 25 to apply the necessary braking force to the left rear road wheel 30 through the coaster brake equipped hub 33 and the other drive train elements connected to that wheel. A hand-controlled brake 87 installed on the front wheel assembly 13 and provided with the usual control lever 88 mounted on the left arm of the handle bars 15 could be used at the same time to provide additional braking force to slow or stop the tricycle.

Although it has been explained that manual control lever 78 is actuated backwardly to transfer the power of the energized motor 67 to the drive wheel after the motor, clutch and solenoid have been eenrgized, it should be recognized that the manual control lever may be kept in its rearward position at all times. This would permit the tricycle to be driven immediately upon energization of the motor without lever movement and with little or no load or drag on the motor or tricycle.

Although but one embodiment of the invention has been shown and described, it will be apparent to those skilled in the art that various changes and modifications may be made therein without departing from the spirit of the invention or from the scope of the appended claims.

What is claimed is:

1. A tricycle comprising:
   a frame,
   a seat mounted on said frame,
   a fork swivelably mounted on the fore end of said frame,
   a front wheel axled in the free ends of said fork,
   a handle bar fixedly mounted on said fork for steering said tricycle,
   pedal means comprising a pair of pedals rotatably mounted on a rotatable axle mounted in suitable bearings in said frame,
   means for mounting in axial alignment a pair of wheels at the aft end of said frame,
   said means comprising a pair of coaxially aligned tubular members,
   means rigidly interconnecting said tubular members to hold the inner ends of said tubular members in axially spaced position,
   means on the outer end of one of said tubular members arranged to be fixed to one end of the bearing axle of one of said pair of wheels to support said one of said pair of wheels in operative position,
   an axle shaft journaled in the other of said tubular members having an inner end projecting into said space between the inner ends of said tubular members,
   a drive sprocket fixed to said inner end of said axle shaft adapted to be driven by a regular bicycle chain connected to a sprocket on said axle of said pedal means,
   a driving flange fixed on the outer end of said axle shaft arranged to be fixed to peripheral teeth of a drive sprocket of a standard coaster-brake to support the coaster-brake on the other of said pair of wheels,
   a direct current motor mounted on said frame,
   a battery mounted on said frame,
   switch means interconnecting said battery to said motor to actuate same,
   drive means interconnecting said motor and said bearing axle of said one of said wheels to rotatably drive said one of said wheels,
   and means for selectively driving said one of said wheels by said motor.

2. The tricycle set forth in claim 1 wherein:
   said drive means comprises a belt drive employing means for selectively tightening and loosening said belt drive to connect or disconnect said motor with said one of said pair of wheels.

3. The tricycle set forth in claim 2 wherein said drive means further comprises a rheostat for controlling the speed of said motor.

4. The tricycle set forth in claim 1 in further combination with:
   a clutch comprising a pair of elements,
   one of said elements being connected to said one of said pair of wheels,
   the other of said elements being connected to said motor, and
   solenoid means connected to said switch means for connecting said elements of said clutch together upon closure of said switch.

5. The tricycle set forth in claim 1 wherein:
   said drive means may independently and simultaneously drives said one of said pair of wheels while said pedal means drives said other of said pair of wheels.

6. The tricycle set forth in claim 1 wherein:
   said motor and said battery are mounted rearwardly of said seat on said frame.

* * * * *